July 5, 1960 J. LOVELL ET AL 2,943,589
SECURING LATCH FOR HATCH COVERS

Filed Oct. 2, 1958 2 Sheets-Sheet 1

INVENTORS
JACK LOVELL
BY WALLACE HAMILTON

ATTORNEY

July 5, 1960

J. LOVELL ET AL 2,943,589

SECURING LATCH FOR HATCH COVERS

Filed Oct. 2, 1958

INVENTORS
JACK LOVELL
BY WALLACE HAMILTON

ATTORNEY

2,943,589

SECURING LATCH FOR HATCH COVERS

Jack Lovell and Wallace Hamilton, Chagrin Falls, Ohio, assignors to Cleveland Pneumatic Industries, Inc., Cleveland, Ohio, a corporation of Ohio Filed Oct. 2, 1958, Ser. No. 764,881

4 Claims. (Cl. 114—203)

This invention relates generally to securing latches and more particularly to a fastener adapted to secure in position a marine hatch cover or the like.

It is an important object of this invention to provide a simple, low cost hatch fastener which is durable and easily operated.

It is another object of this invention to provide a hatch cover latch mechanism which does not require pivot pins and the like and which can be manufactured with a minimum amount of machining.

Further objects and advantages will appear from the following description and drawings, wherein.

A latch assembly according to this invention is particularly suited for use in fastening hatch covers to the coaming of a ship to prevent their being washed overboard during storms and which insures that the hatch cover seal is properly compressed at all times. It should be understood, however, that a latch of this type could be used to releasably connect other types of articles and the invention should not be limited to hatch covers per se even though it is illustrated only in connection with such an installation.

Figure 1:
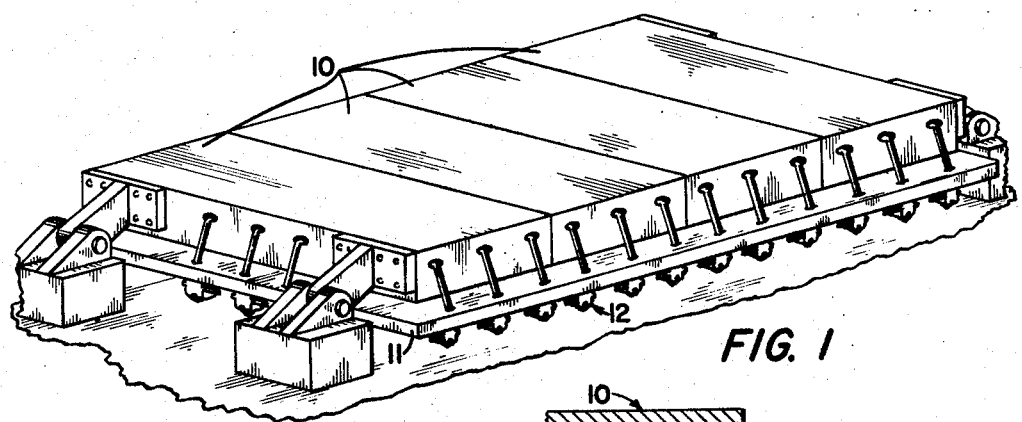
Figure 1 is a perspective view of a typical hatch cover installation with the clamping or latching devices according to this invention installed thereon.

In Figure 1, a typical hatch cover is shown which includes four panels 10 which extend over and close a hatchway defined by a coaming 11 on the deck structure of a ship. In the particular hatch cover shown, the panels are formed of strutted steel and are hinged for power operation in the manner disclosed and claimed in the co-pending application of Joseph E. Hannigan, Serial No. 704,748, filed December 23, 1957, now Patent No. 2,906,326. The panels 10 can be operated after the latches are disconnected to fold back to open the hatchway. For a complete description of the operation of and structural details of such panels, reference should be made to the cited co-pending application.

Referring to Figures 2 to 5, each panel 10 is provided with a side wall 9 which engages the coaming 11 and a resilient seal 8 engaging a projection 7 to provide a fluid tight joint with the coaming. The engagement of the side wall 9 with the coaming 11 provides the support of the panels and prevents overcompression of the seal 8.

To provide positive locking of the panels 10 to the coaming 11, a plurality of latch assemblies 12 are positioned around the periphery of the cover and connect the panels to the coaming 11 in a positive mechanical manner. Each of these assemblies includes the structure disclosed in Figures 2 through 5 so a description of a single latch device 12 applies equally to all of the others.

The latch device 12 includes a rod 13 loosely extending through a hole 14 formed in a lateral flange 15 on the coaming 11 which is formed with an upper hook portion 16 extending through a transverse opening 17 in a skirt 18 formed on the panels 10 outside of the side wall 9. Positioned below the hole 14 and surrounding the rod 13 is a resilient tubular thrust member 19 supported at its lower end by an upper thrust washer 21. Below the upper thrust washer 21 is a camming member 22 which engages on its lower end a second or lower thrust washer 23. A nut fastener 24 is threaded onto the lower end of the rod 13 and holds the second thrust washer 23 in the position shown.

Figure 2:
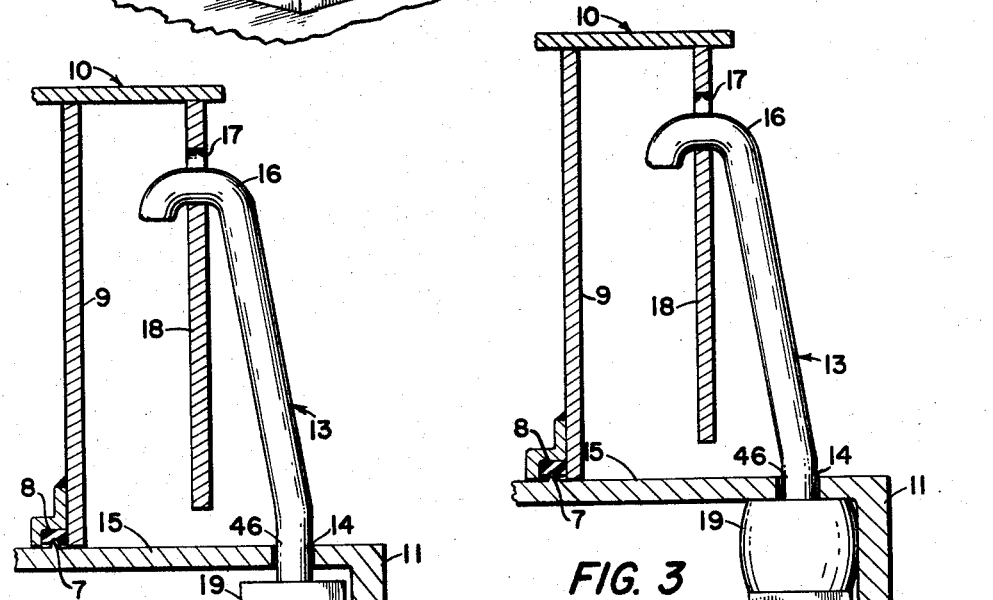
Figure 2 is an enlarged fragmentary view of a latch assembly incorporating this invention in the unlocked or loosened position.

In Figure 2, the latch device 12 is illustrated in the unlatched position at which time the upper thrust washer 21 engages a flat surface 26 on the cam member 22. The cam member 22 is provided with a rounded bearing or pivot portion 27 which engages the second thrust washer 23 and the flat surface 26 is such that the clamping assembly is hanging loosely from the hook portion 16.

Figure 3:
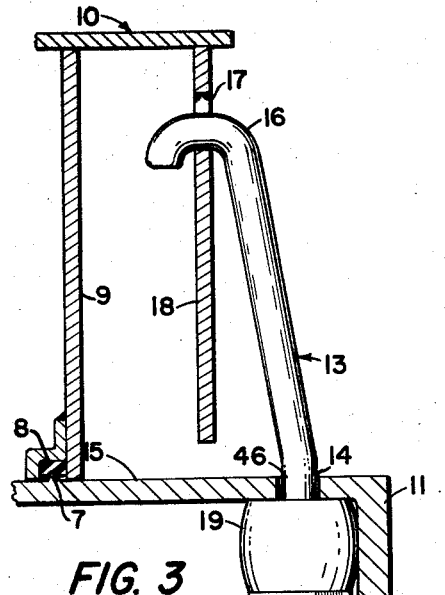
Figure 3 is a view similar to Figure 2 showing the position the elements assume in the locked or latched position.

In order the lock the latch device 12, it is merely necessary to rotate the cam member 22 to the position shown in Figure 3 at which time the upper thrust washer 21 is seated against a second flat surface 28 of the cam member 22 which is spaced from the bearing portion 27 by a distance greater than the spacing between the bearing portion 27 and the flat portion 26. When the nut fastener 24 is properly adjusted, rotation of the camming member 22 to the position shown in Figure 3 causes the upper side of the tubular member 19 to be compressed against the lower side of the coaming 11 which in turn produces a reaction force urging the rod 13 and the hook portion 16 downwardly relative to the coaming 11 to secure the panel 10 in its latched or locked position. Therefore, the tubular member 19, the upper thrust washer 21 and the cam member 22 co-operate to form a latching assembly which extends between the flange 15 and the lower thrust washer 23 the overall length of which can be changed by rotating the cam member 22. To insure that the latch will remain in the locked position, the second surface is proportioned so that it engages the upper thrust washer 21 on both sides of the axis of the rod 13.

Figure 4:
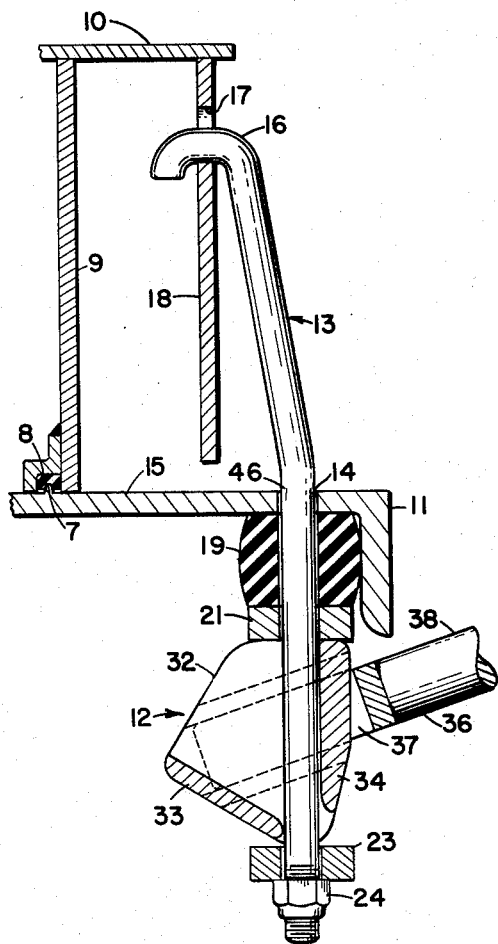
Figure 4 is a view similar to Figure 3 partially in section to show the structure of the camming member.
Figure 5:
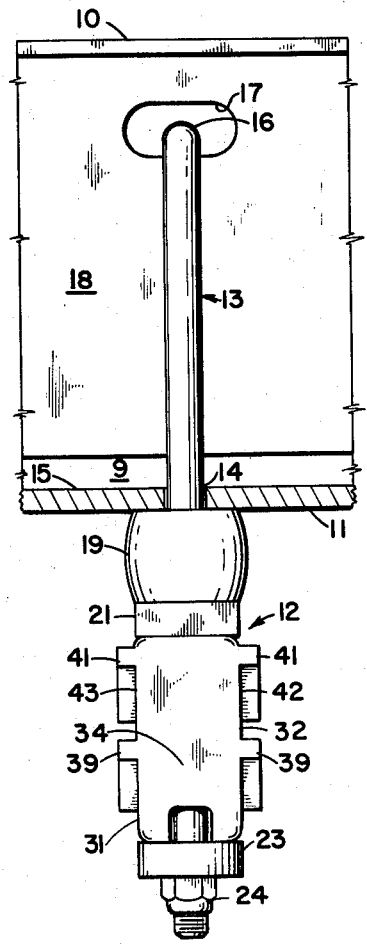
Figure 5 is a view of the latching assembly in the locked or latched position taken at 90° from the viewing plane of Figures 2 to 4 and with the operating wrench removed.

The camming member 22 is formed with opposed substantially parallel side walls 31 and 32 connected by diverging lateral walls 33 and 34 as shown in Figure 4. Therefore, the camming member 22 is provided with an open slot through which the rod extends. The lateral walls 33 and 34 should be proportioned so that the wall 33 extends along the rod 13 when the latch is in the unlocked position of Figure 2, and the lateral wall 34 extends along the rod 13 when the latch assembly is in the locked position shown in Figures 3 and 4. Therefore, the lateral walls 33 and 34 act as stops and prevent the operator from moving the camming member 22 beyond the locked and unlocked positions. The lower ends of the lateral walls 33 and 34 are adjacent to the rod 13 and in co-operation with the side walls 31 and 32 form a pivot type connection at 27 between the camming member 22 and the rod 13.

In order to move the camming member 22 between the unlocked position of Figure 2 and the latched position of Figure 3, we provide a forked wrench 36 which is formed with parallel spaced projections 37 connected to a handle 38. The side walls 31 and 32 are each formed with parallel ribs 39 and 41 which co-operate to form opposed open grooves 42 and 43 proportioned to receive the projections 37. Because the grooves 42 and 43 are opposed, it is not necessary to close them to provide a wrenching connection. Thus, it is a simple matter to slip the wrench 36 onto the camming member 22 to move the camming member 22 between the latched and unlatched positions.

In practice, the camming member 22 can be formed of a simple casting and the rod 13 by bending rod material to the proper shape. If it is desired, it is possible to eliminate the necessity of the resilient tubular member 19 by providing a rod 13 with sufficient resiliency either at a bend 46 or at the hook portion 16. Assuming that the hatch cover is secured and that the latch assemblies are in the latched positions of Figure 3, it is merely necessary to rotate the cam member 22 to the unlatched position of Figure 2 by using the wrench 36. At this time, the latch is loose and the hook portion 16 is slipped out of the opening 17 and the latch device 12 is dropped down until the hook portion 16 engages the coaming 11. The latch device 12 is then out of the way and the hatch can be opened. When the hatch is again to be secured, it is merely necessary to raise the latch assembly 12 and insert the hook portion 16 into the opening 17 after which the cam member 22 is rotated to the locked or latched position of Figure 3 by the wrench 36.

Although a preferred embodiment of this invention is illustrated, it will be realized that various modifications of the structural details may be made without departing from the mode of operation and the essence of the invention. Therefore, except insofar as they are claimed in the appended claims, structural details may be varied sidely without modifying the mode of operation. Accordingly, the appended claims and not the aforesaid detailed description are determinative of the scope of the invention.

We claim:

1. In combination, a coaming around a hatchway, a movable hatch cover on said coaming closing said hatchway, a lateral apertured flange on said coaming, a rod extending through the aperture of said flange formed with an upper hook releasably connected to said hatch cover, a lower thrust member on said rod below said flange, and a latch assembly on said rod between said flange and lower thrust member, said assembly including a cam on said rod movable from a first position wherein said assembly engages said thrust member and the underside of said flange producing a force urging said rod downward and clamping said hatch cover to said coaming and a second position wherein said assembly moves out of engagement with the underside of said flange, said cam including similar side walls on opposite sides of said rod and diverging lateral walls connecting said side walls, one of said lateral walls adapted to engage said rod to limit movement of said cam to said first position.

2. In combination, a coaming round a hatchway, a movable hatch cover on said coaming closing said hatchway, a lateral apertured flange on said coaming, a rod extending through the aperture of said flange formed with an upper hook releasably connected to said hatch cover, a lower thrust member on said rod below said flange, a latch assembly on said rod between said flange and lower thrust member, said assembly including a cam on said rod movable from a first position wherein said assembly engages said thrust member and the underside of said flange producing a force urging said rod downward and clamping said hatch cover to said coaming and a second position wherein said assembly moves out of engagement with the underside of said flange, said cam including similar side walls on opposite sides of said rod formed with similar opposed wrenching grooves and diverging lateral walls connecting said side walls, one of said lateral walls adapted to engage said rod to limit movement of said cam to said first position, and a wrench having projections positioned in said grooves operable to move said cam between said first and second positions.

3. In combination, a coaming around a hatchway, a movable hatch cover on said coaming closing said hatchway, a lateral apertured flange on said coaming, a rod extending through the aperture of said flange formed with an upper hook releasably connected to said hatch cover, a lower thrust member on said rod below said flange, and a latch assembly on said rod between said flange and lower thrust member, said assembly including a resilient thrust member and a cam on said rod movable from a first position wherein said assembly engages said lower thrust member and the underside of said flange compressing said resilient thrust member producing a force urging said rod downward and clamping said hatch cover to said coaming and a second position wherein said assembly moves out of engagement with the underside of said flange, said cam including similar side walls on opposite sides of said rod and diverging lateral walls connecting said side walls, one of said lateral walls adapted to engage said rod to limit movement of said cam to said first position.

4. In combination, a coaming around a hatchway, a movable hatch cover on said coaming closing said hatchway, a lateral apertured flange on said coaming, a rod extending through said aperture of said flange formed with an upper hook releasably connected to said hatch cover, a lower thrust member on said rod below said flange, and a latch assembly on said rod between said flange and lower thrust member, said assembly including a cam on said rod movable from a first position wherein said assembly engages said thrust member and the underside of said flange producing a force urging said rod downward and clamping said hatch cover to said coaming and a second position wherein said assembly moves out of engagement with the underside of said flange, said cam including similar side walls on opposite sides of said rod and diverging lateral walls connecting said side walls, said lateral walls having ends adjacent to opposite sides of said rod providing in co-operation with said side walls a pivot connection with said rod, one of said lateral walls extending along one side of said rod when said cam is in said first position and the other of said lateral walls extending along the opposite side of said rod when said cam is in said second position.

References Cited in the file of this patent

UNITED STATES PATENTS

| | | |
|---|---|---|
| 1,664,972 | Dudderar | Apr. 3, 1928 |

FOREIGN PATENTS

| | | |
|---|---|---|
| 872,019 | Germany | Mar. 30, 1953 |